(12) United States Patent  
Lee et al.

(10) Patent No.: US 9,059,585 B2  
(45) Date of Patent: Jun. 16, 2015

(54) SELF-DISCHARGE CONTROL FOR AN EMI FILTER CAPACITOR

(71) Applicant: Richtek Technology Corporation, Chupei, Hsinchu (TW)

(72) Inventors: Yen-Te Lee, Zhongpu Township, Chiayi County (TW); Kuo-Chi Liu, Hsinchu (TW); Wen-Wei Chen, New Taipei (TW); Yi-Fan Chen, Taipei (TW); Kuang-Feng Li, Yuanlin Township, Changhua County (TW)

(73) Assignee: Richtek Technology Corp., Chupei, Hsinchu (TW)

( * ) Notice: Subject to any disclaimer, the term of this patent is extended or adjusted under 35 U.S.C. 154(b) by 196 days.

(21) Appl. No.: 13/729,936

(22) Filed: Dec. 28, 2012

(65) Prior Publication Data

US 2013/0170261 A1 Jul. 4, 2013

(30) Foreign Application Priority Data

Dec. 28, 2011 (TW) .............................. 100149198 A

(51) Int. Cl.
*H02H 7/16* (2006.01)
*H02M 7/06* (2006.01)
*H02M 1/44* (2007.01)
*H02M 1/32* (2007.01)

(52) U.S. Cl.
CPC . *H02H 7/16* (2013.01); *H02M 7/06* (2013.01); *H02M 1/44* (2013.01); *H02M 2001/322* (2013.01)

(58) Field of Classification Search
CPC .................................................. H02M 2001/322
USPC ............................... 320/166; 361/220; 363/53
See application file for complete search history.

(56) References Cited

U.S. PATENT DOCUMENTS

| | | | |
|---|---|---|---|
| 8,625,251 B2* | 1/2014 | Urienza | 361/220 |
| 8,710,804 B2* | 4/2014 | Ptacek et al. | 320/166 |
| 2011/0025278 A1* | 2/2011 | Balakrishnan et al. | 320/166 |
| 2013/0147440 A1* | 6/2013 | Shiroyama et al. | 320/166 |

* cited by examiner

*Primary Examiner* — Harry Behm
(74) *Attorney, Agent, or Firm* — Muncy, Geissler, Olds & Lowe, P.C.

(57) ABSTRACT

An independent bleeding integrated circuit device is provided to replace the bleeding resistor for an EMI filter capacitor, to establish a discharge path between the two terminals of the EMI filter capacitor when the EMI filter capacitor is disconnected from an AC power source, for discharging the EMI filter capacitor. When the EMI filter capacitor is connected with an AC power source, the discharge path is cut off to avoid power loss.

22 Claims, 15 Drawing Sheets

SELF-DISCHARGE CONTROL FOR AN EMI FILTER CAPACITOR

FIELD OF THE INVENTION

The present invention is related generally to an alternating current/direct current (AC/DC) power interface and, more particularly, to a bleeding circuit for an electro-magnetic interference (EMI) filter capacitor.

BACKGROUND OF THE INVENTION

An AC/DC power converter is typically used to convert a commercial AC power source into a DC power supply of a specific voltage. Referring to FIG. 1, at the AC power input terminals 12 and 14 of an AC/DC power converter for connecting to an AC power source 10, there is an AC/DC power interface 16 which includes a bridge rectifier 18 to rectify the AC voltage VAC supplied by the AC power source 10 into a DC input voltage Vin for the AC/DC power converter to further converter into a DC output voltage. The AC/DC power interface 16 also includes an EMI filter capacitor X-CAP connected between the AC power input terminals 12 and 14. However, the presence of the EMI filter capacitor X-CAP brings a risk of electric shock because once the AC power source 10 is removed, the EMI filter capacitor X-CAP will sustain the voltage of the AC power source 10 that occurs at the instant moment when the AC power source 10 is removed, and may be up to hundreds of volts. For this issue, conventional solutions to comply with safety specification NE60950 or IEC950 are to connect a bleeding resistor Rb parallel to the EMI filter capacitor X-CAP, such that upon removal of the AC power source 10, the bleeding resistor Rb and the EMI filter capacitor X-CAP establish a circuit loop for discharging the EMI filter capacitor X-CAP. Nevertheless, the presence of the bleeding resistor Rb connected between the AC power input terminals 12 and 14 establishes a normally conductive current path between the AC power input terminals 12 and 14, resulting in power loss $Ploss=VAC^2/Rb$ as long as the AC power source 10 is connected with the AC power input terminals 12 and 14, and thereby reducing the efficiency of the AC/DC power converter. In addition, IEC950 requires the discharge time of the EMI filter capacitor X-CAP be shorter than the time constant of one second. Therefore, to conform to this safety specification, the larger the EMI filter capacitor X-CAP is, the smaller the bleeding resistor Rb must be, and yet the smaller this resistance, the greater the power loss caused by the bleeding resistor Rb. For example, under VAC=230V, if X-CAP=5 µF and Rb=150KΩ, then Ploss=353 mW. In other words, power loss of 353 mW occurs even when the AC/DC power converter is at no loading state or in a standby mode. While specifications on power loss were relatively loose in the past, the rising awareness of environmental protection has led to more tight requirements on power loss; however, power loss resulting from the bleeding resistor Rb has hindered compliance of the AC/DC power converter with today's much stricter environmental protection specifications.

U.S. Pat. No. 7,046,529 uses the circuit of the AC/DC power converter to generate a control signal for switching a plurality of resistors in the AC/DC power interface 16 between a plurality of configurations. Once the AC power source 10 is removed, the resistors are reconfigured to establish a smaller equivalent resistance as the bleeding resistor Rb to discharge the EMI filter capacitor X-CAP within a required time period. When the AC power source 10 is connected, the resistors are reconfigured to establish a larger equivalent resistance as the bleeding resistor Rb to reduce power loss. However, this approach does not eliminate the use of the bleeding resistor Rb, and thus power loss still occurs. Moreover, this approach requires modification of the circuit of the AC/DC power converter and is thus not applicable to existing AC/DC power converters unless the circuits of existing AC/DC power converters are redesigned.

SUMMARY OF THE INVENTION

An objective of the present invention is to provide a self-discharge bleeding circuit for an EMI filter capacitor.

Another objective of the present invention is to provide an independent bleeding integrated circuit device for an EMI filter capacitor.

Yet another objective of the present invention is to provide a bleeding method for an EMI filter capacitor.

Still another objective of the present invention is to provide an AC/DC power interface.

According to the present invention, a self-discharge bleeding circuit for an EMI filter capacitor includes a bleeding switch and a controller. The bleeding switch is connected between the two terminals of the EMI filter capacitor, and the controller turns on the bleeding switch when the voltage of the EMI filter capacitor has continuously exceeded a threshold value for a threshold time, such that a discharge path is established between the two terminals of the EMI filter capacitor for the EMI filter capacitor to discharge through the discharge path.

The self-discharge bleeding circuit does not need an external control signal and therefore can be produced as an independent bleeding integrated circuit device directly applicable to any AC/DC power converters.

According to the present invention, a bleeding method for an EMI filter capacitor includes connecting a bleeding switch between two AC power input terminals that are connected by the EMI filter capacitor, wherein the bleeding switch is open circuit when the two AC power input terminals are connected to an AC power source, and turning on the bleeding switch when the voltage of the EMI filter capacitor has continuously exceeded a threshold value for a threshold time, such that a discharge path is established between the two terminals of the EMI filter capacitor for the EMI filter capacitor to discharge through the discharge path.

According to the present invention, an AC/DC power interface connected between two AC power input terminals includes an external bridge rectifier connected to the two AC power input terminals, an EMI filter capacitor connected between the two AC power input terminals, a bleeding switch connected between the two AC power input terminals, and a controller connected to the bleeding switch. The controller turns on the bleeding switch when the voltage of the EMI filter capacitor has continuously exceeded a threshold value for a threshold time, such that a discharge path is established between the two terminals of the EMI filter capacitor for the EMI filter capacitor to discharge through the discharge path.

Since the bleeding switch is open circuit when the EMI filter capacitor is connected to an AC power source, additional power loss can be avoided, and this helps increase the efficiency of an AC/DC power converter.

BRIEF DESCRIPTION OF THE DRAWINGS

These and other objectives, features and advantages of the present invention will become apparent to those skilled in the art upon consideration of the following description of the preferred embodiments of the present invention taken in conjunction with the accompanying drawings, in which.

DETAILED DESCRIPTION OF THE INVENTION

Figure 1:
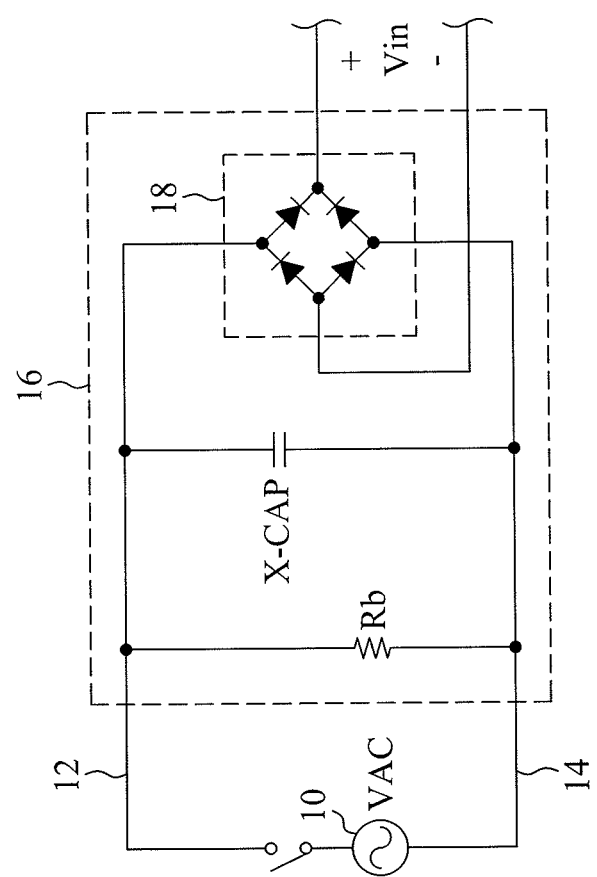
FIG. 1 is a circuit diagram of a conventional AC/DC power interface of an AC/DC power converter in connection to an AC power source.
Figure 2:
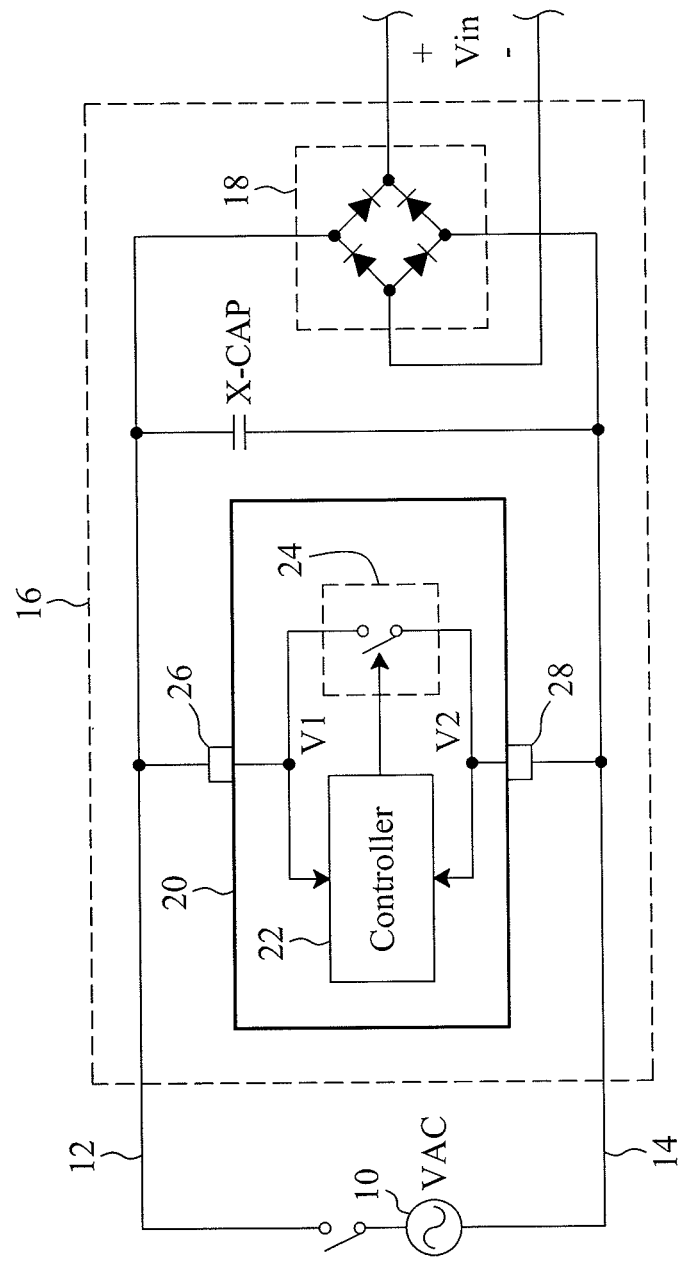
FIG. 2 is a circuit diagram of an AC/DC power interface according to the present invention.

The bleeding resistor Rb shown in FIG. 1 is only for discharging the EMI filter capacitor X-CAP after the AC power source 10 is removed to conform to safety specifications such as NE60950 and IEC950. In other words, the bleeding resistor Rb is totally unnecessary while the AC power source 10 supplies power to the AC/DC power converter. Based on this characteristic, a self-discharge bleeding circuit is designed as shown in FIG. 2, which includes a controller 22 and a bleeding switch 24 both connected between the AC power input terminals 12 and 14. The bleeding switch 24 is open circuit when the AC power source 10 supplies power to the AC/DC power converter, and thus power loss attributable to the bleeding switch 24 can be avoided regardless of whether the AC/DC power converter is in normal operation or in a standby mode. However, once the AC power source 10 is removed, the bleeding switch 24 becomes a closed circuit such that the EMI filter capacitor X-CAP can discharge. Specifically, this self-discharge bleeding circuit can work independently, i.e., without cooperation of or control signals provided by other circuits, and thus it can be made into an independent bleeding integrated circuit (IC) device 20 as shown in FIG. 2, which can be directly applied to an AC/DC power converter without having to modify or redesign the circuit of the AC/DC power converter. The terminals V1 and V2 of the bleeding switch 24 are connected to the pins 26 and 28 of the independent bleeding IC device 20, respectively, and the pins 26 and 28 are connected to the AC power input terminals 12 and 14, respectively. The controller 22 is connected to the bleeding switch 24 and can turn on the bleeding switch 24 upon detecting that the voltage across the pins 26 and 28 has continuously exceeded a threshold value TH for a threshold time Tpre, so as to establish a discharge path between the pins 26 and 28 through which the EMI filter capacitor X-CAP can discharge. When the bleeding switch 24 is on, its equivalent resistance is very small, and this allows an AC/DC power converter to comply with NE60950 and IEC950.

Figure 3:
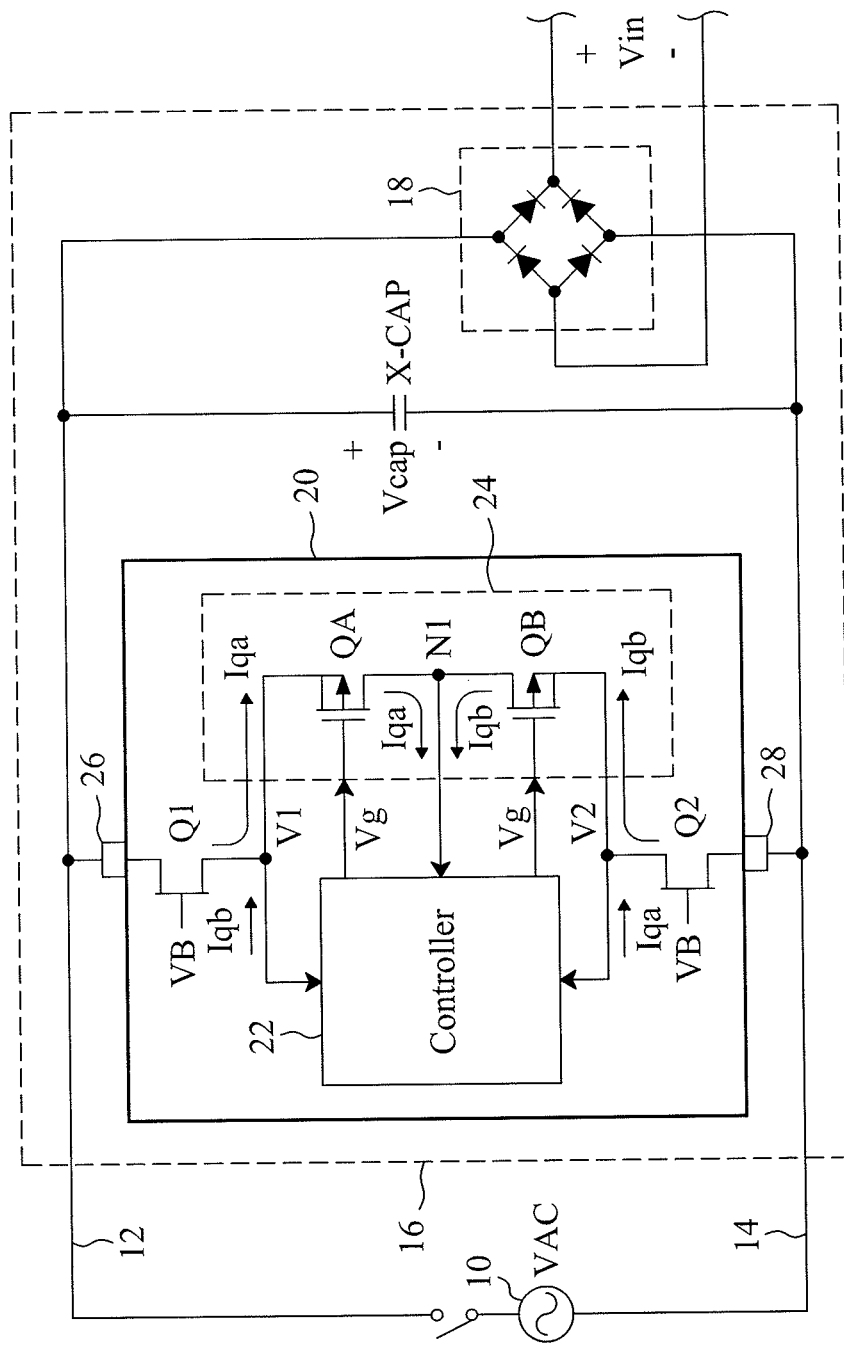
FIG. 3 is a circuit diagram of a first embodiment for the self-discharge bleeding circuit shown in FIG. 2.

Alternatively, as shown in FIG. 3, high voltage blocking elements Q1 and Q2 are additionally inserted between the self-discharge bleeding circuit and the pin 26, and between the self-discharge bleeding circuit and the pin 28, respectively, for blocking high voltages to the self-discharge bleeding circuit, such that the controller 22 and the bleeding switch 24 can be made by low-voltage manufacturing processes. In this embodiment, the high voltage blocking elements Q1 and Q2 use junction field effect transistors (JFETs), and according to the JFET's characteristics, the maximum value of each of the voltages V1 and V2 will be clamped under VB-Vp, where VB and Vp are the gate bias and the pinch-off voltage of the JFET, respectively. The bleeding switch 24 may include two face-to-face bleeding switches QA and QB, which are in an opposite series connection. In this embodiment, both the bleeding switches QA and QB are PMOS transistors and are controlled by a control signal Vg provided by the controller 22, and the interconnection node N1 between the bleeding switches QA and QB is also connected to the controller 22. The bleeding switch 24 is on when the controller 22 turns on either the discharge switch QA or the discharge switch QB, and the bleeding switch 24 is off when the controller 22 turns off both the bleeding switches QA and QB. When the first discharge switch QA is on and the second discharge switch QB is off, a bleeding current Iqa can flow from the first AC power input terminal 12 to the second AC power input terminal 14. When the first discharge switch QA is off and the second discharge switch QB is on, a bleeding current Iqb can flow from the second AC power input terminal 14 to the first AC power input terminal 12.

Figure 4:
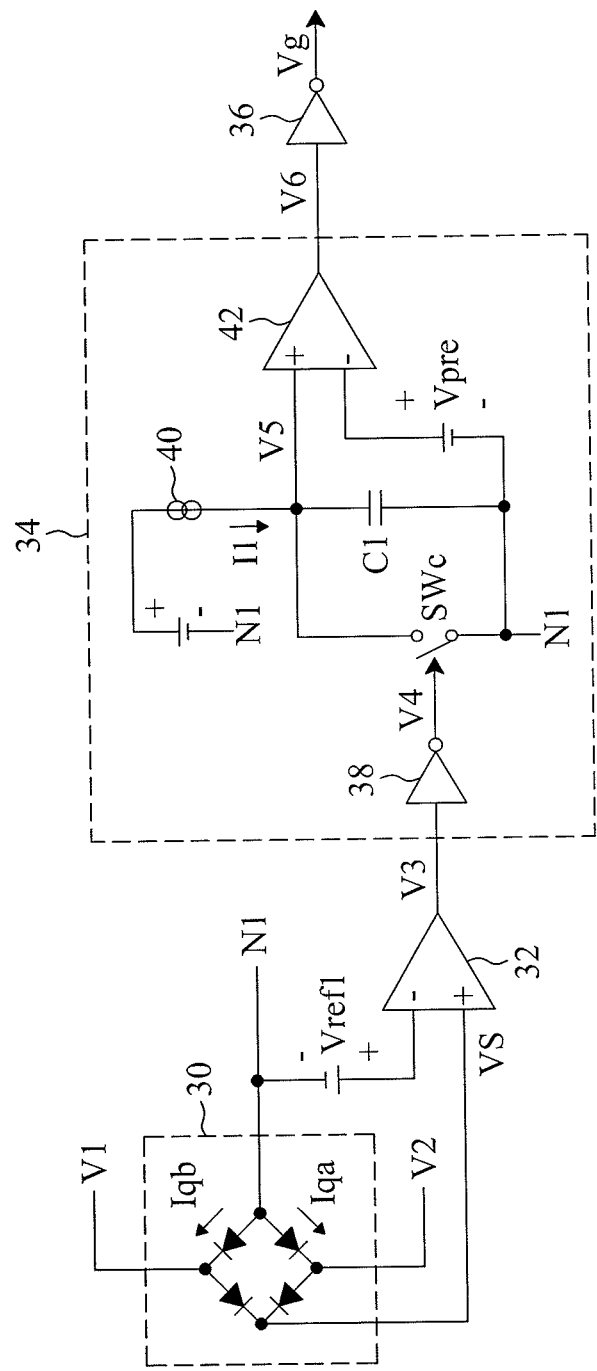
FIG. 4 is a circuit diagram of an embodiment for the controller shown in FIG. 3.

FIG. 4 shows an embodiment of the controller 22 in FIG. 3, in which the input terminals of the bridge rectifier 30 are connected to the terminals V1 and V2 of the bleeding switch 24, respectively, the output terminals of the bridge rectifier 30 are connected to the node N1 and the positive input terminal VS of a comparator 32, respectively, and a voltage source Vref1 is connected between the negative input terminal of the comparator 32 and the node N1. For the sake of distinction, the bridge rectifier 18 shown in FIG. 3 is hereinafter called the external bridge rectifier, and the bridge rectifier 30 in the self-discharge bleeding circuit is called the internal bridge rectifier. In this embodiment, the internal bridge rectifier 30 is a full-wave bridge rectifier for rectifying the voltage across the terminals V1 and V2 of the bleeding switch 24 and to generate an under detection voltage VS, the voltage source Vref1 provides a reference voltage Vref1, the comparator 32 compares the under detection voltage VS with the reference voltage Vref1 and, if the under detection voltage VS is higher than the reference voltage Vref1, triggers a comparison signal V3, a timer 34 triggers a control signal V6 when the comparison signal V3 has lasted for the threshold time Tpre, and an inverting driver 36 generates the control signal Vg from the control signal V6 so as to turn on one of the bleeding switches QA and QB. The timer 34 includes an inverter 38 for inverting the comparison signal V3 into a reset signal V4, which will reset a switch SWc connected in parallel to a capacitor C1, the capacitor C1 and a current source 40 jointly establish an integration circuit, the current source 40 provides a charging current I1 for charging the capacitor C1 to thereby generate a voltage V5, and a comparator 42 compares the voltage V5 with a time-setting voltage Vpre to generate the control signal V6. In this embodiment, the reference voltage Vref1 and the time-setting voltage Vpre determine the aforesaid threshold value TH and threshold time Tpre, respectively.

Figure 5:
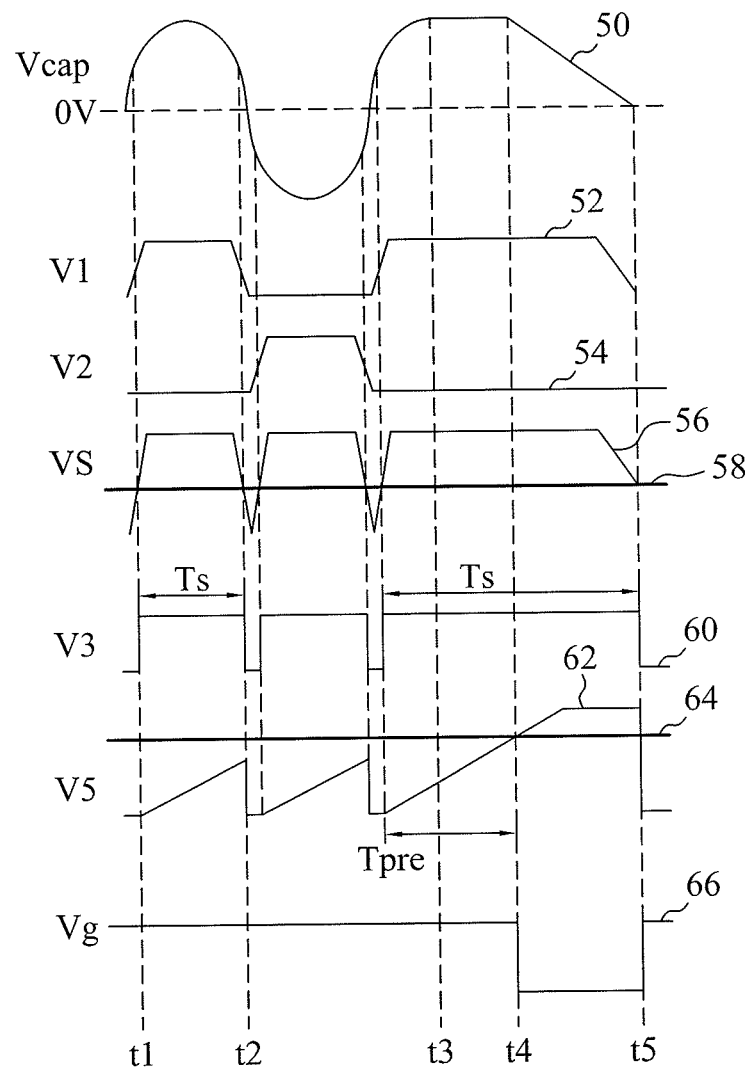
FIG. 5 is a waveform diagram produced when the circuit shown in FIG. 4 is applied to the controller shown in FIG. 3.

FIG. 5 is a waveform diagram produced when the circuit shown in FIG. 4 is applied to the controller 22 shown in FIG. 3, in which waveform 50 represents the voltage Vcap across the terminals of the EMI filter capacitor X-CAP, waveform 52 represents the voltage V1 at the first terminal of the bleeding switch 24, waveform 54 represents the voltage V2 at the second terminal of the bleeding switch 24, waveform 56 represents the under detection voltage VS, waveform 58 represents the reference voltage Vref1, waveform 60 represents the comparison signal V3, waveform 62 represents the voltage V5 of the capacitor C1, waveform 64 represents the time-setting voltage Vpre, and waveform 66 represent the control signal Vg. Referring to FIGS. 3, 4 and 5, when the AC power source 10 is in supplying power, the voltage Vcap across the terminals of the EMI filter capacitor X-CAP has a sine wave as shown by the waveform 50, the maximum voltages applied to the terminals V1 and V2 of the bleeding switch 24 are clamped by the high voltage blocking elements Q1 and Q2, respectively, such that the voltages V1 and V2 are as shown by the waveforms 52 and 54, respectively, and the internal bridge rectifier 30 rectifies the voltages V1 and V2 to generate the under detection voltage VS as shown by the waveform 56. When the under detection voltage VS rises above the reference voltage Vref1, as indicated at time t1 in FIG. 5, the comparator 32 triggers the comparison signal V3, and until time t2, the under detection voltage VS falls below the reference voltage Vref1, the comparison signal V3 terminates. During the period Ts in which the comparison signal V3 is asserted, the switch SWc is open circuit and thus the charging current I1 continues charging the capacitor C1, causing the voltage V5 increasing. When the AC power source 10 is in supplying power, the time Ts that the comparison signal V3 lasts is shorter than the threshold time Tpre determined by the time-setting voltage Vpre, thus the voltage V5 will not reach the time-setting voltage Vpre, and the control signal Vg stays high, thereby keeping both the bleeding switches QA and QB being open circuits. After the AC power source 10 is removed at time t3 shown in FIG. 5, the voltage Vcap remains as high as at the instant moment of removal of the AC power source 10, i.e. time t3. If this voltage Vcap makes the under detection voltage VS higher than the reference voltage Vref1, the comparator 32 will continue the comparison signal V3, and when the time Ts that the comparison signal V3 has lasted reaches the threshold time Tpre as shown at time t4 in FIG. 5, the voltage V5 of the capacitor C1 reaches the time-setting voltage Vpre; as a result, the control signal Vg terminates, and the first discharge switch QA becomes closed circuit and thereby establishes a discharge path. Since the on resistance of the first discharge switch QA is very low, the bleeding current Iqa can be rather large, thereby allowing the EMI filter capacitor X-CAP to discharge rapidly. If, however, the voltage Vcap occurring when the AC power source 10 is removed is in a negative half cycle of the AC voltage VAC, termination of the control signal Vg will turn the second discharge switch QB into closed circuit so as to establish the bleeding current Iqb.

In more details, referring to FIGS. 3 and 4, if the AC power source 10 is removed in a positive half cycle of the AC voltage VAC, the gate-source voltage Vg-V2 of the second discharge switch QB will be greater than the threshold voltage Vt of the second discharge switch QB, and thus the second discharge switch QB will not be conductive, and the discharge current Iqa of the EMI filter capacitor X-CAP will flow from the high voltage blocking element Q1 to the high voltage blocking element Q2 through the first discharge switch QA and the internal bridge rectifier 30. In other words, the discharge path in this case consists of the high voltage blocking elements Q1 and Q2, the first discharge switch QA, and the internal bridge rectifier 30. If the AC power source 10 is removed in a negative half cycle of the AC voltage VAC, the gate-source voltage Vg-V1 of the first discharge switch QA will be greater than the threshold voltage Vt of the first discharge switch QA, and thus the first discharge switch QA will not be conductive, and the discharge current Iqb of the EMI filter capacitor X-CAP will flow from the high voltage blocking element Q2 to the high voltage blocking element Q1 through the second discharge switch QB and the internal bridge rectifier 30. In other words, the discharge path in this case consists of the high voltage blocking elements Q1 and Q2, the second discharge switch QB, and the internal bridge rectifier 30.

Figure 6:
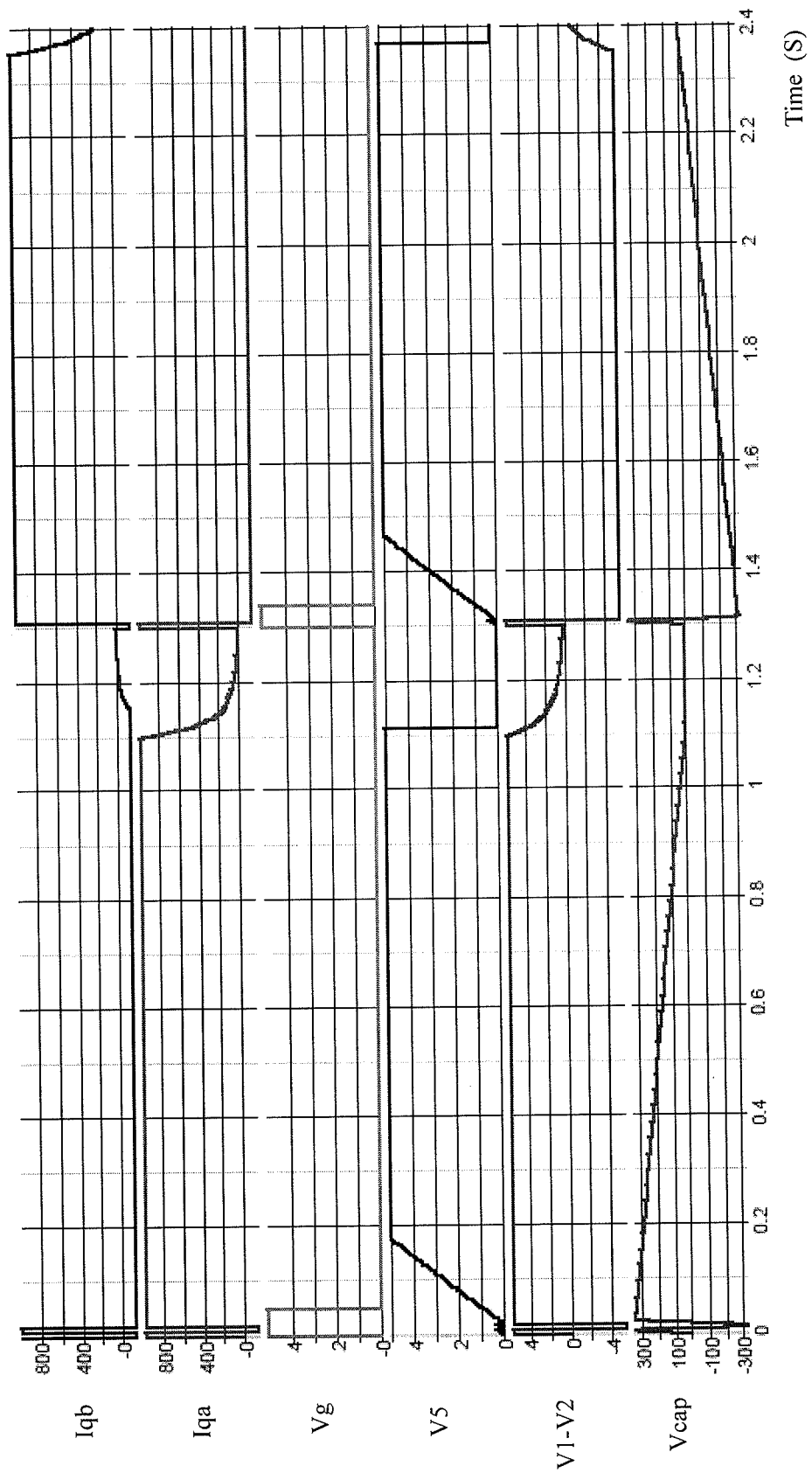
FIG. 6 is a simulation result obtained when the controller of FIG. 3 uses the circuit of FIG. 4.

FIG. 6 shows a simulation result obtained when the controller 22 of FIG. 3 uses the circuit of FIG. 4. Regardless of whether the AC power source 10 is removed at a peak or valley of the voltage Vcap, the independent bleeding IC device 20 can relax the voltage Vcap to the range specified in the aforementioned safety specifications within one second.

Figure 7:
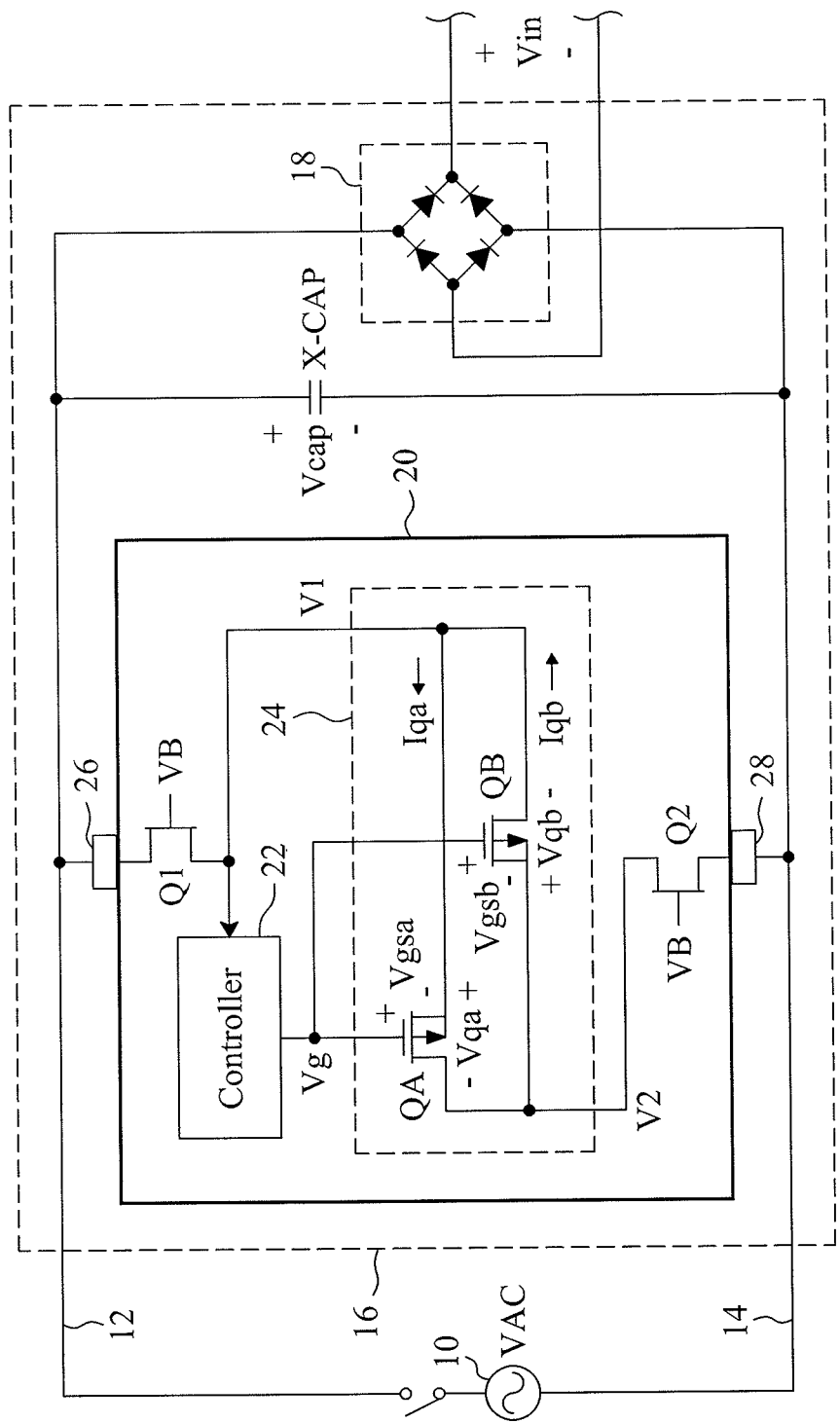
FIG. 7 is a circuit diagram of a second embodiment for the self-discharge bleeding circuit shown in FIG. 2.

In an embodiment as shown in FIG. 7, the bleeding switch 24 may include two bleeding switches QA and QB in an opposite parallel connection, where both the bleeding switches QA and QB are PMOS transistors and are controlled by a controller 22.

Figure 8:
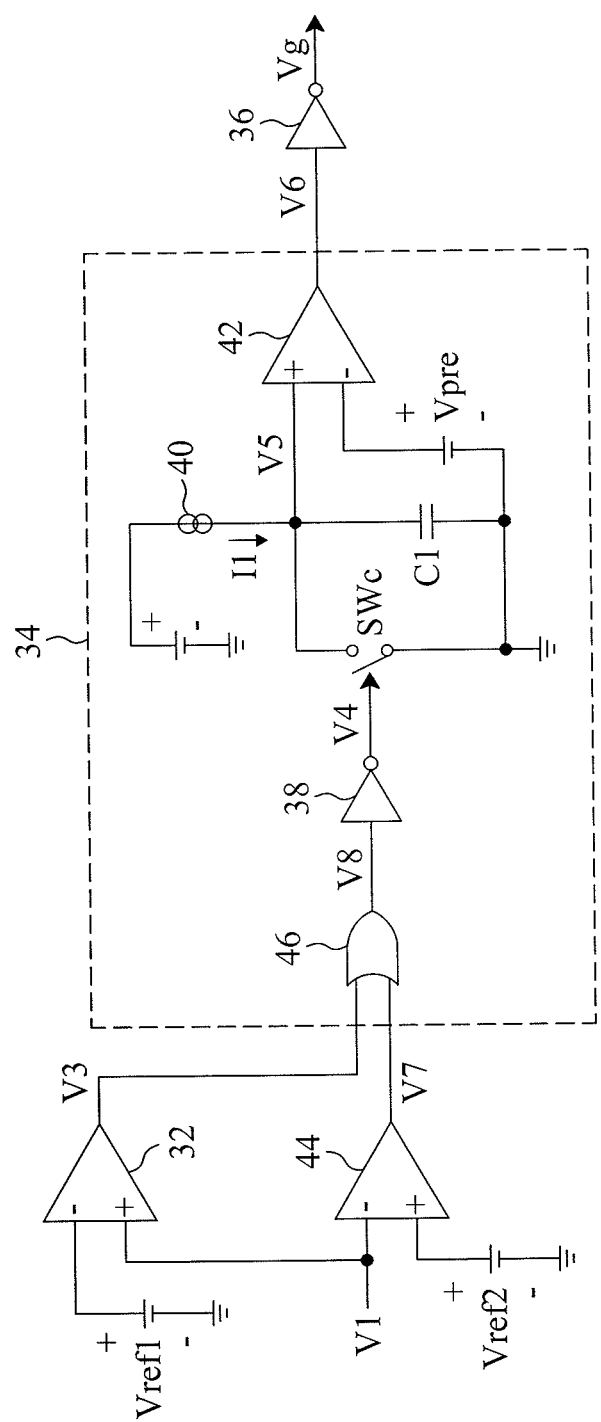
FIG. 8 is a circuit diagram of a first embodiment for the controller shown in FIG. 7.

FIG. 8 shows a first embodiment of the controller 22 in FIG. 7, which includes comparators 32 and 44 both connected to the first terminal V1 of the bleeding switch 24 for comparing the voltage V1 with reference voltages Vref1 and Vref2, respectively, where Vref1>Vref2. The comparator 32 triggers a first comparison signal V3 when the voltage V1 becomes higher than the first reference voltage Vref1, and the comparator 44 triggers a second comparison signal V7 when the voltage V1 becomes lower than the second reference voltage Vref2. A timer 34 counts the time Ts1 that the comparison signal V3 lasts or the time Ts2 that the comparison signal V7 lasts. After removal of the AC power source 10, when either the time Ts1 or the time Ts2 reaches a threshold time Tpre, the timer 34 will trigger a control signal V6, from which an inverting driver 36 generates the control signal Vg. The control signal Vg turns on the discharge switch QA or QB, thereby establishing a discharge path for discharging the EMI filter capacitor X-CAP. In the timer 34 of FIG. 8, the inverter 38, the reset switch SWc, the capacitor C1, the current source 40 and the comparator 42 are identical to their counterparts in FIG. 4, and an OR gate 46 is additionally provided for generating a signal V8 as the input of the inverter 38 according to the comparison signals V3 and V7. The signal V8 will be triggered regardless of whether the comparison signal V3 or V7 is triggered. In other embodiments, it may configure the comparators 32 and 44 to compare the voltage V2, instead of the voltage V1, at the second terminal of the bleeding switch 24 with the reference voltages Vref1 and Vref2, respectively, thereby identifying whether the AC power source 10 has been removed.

Figure 9:
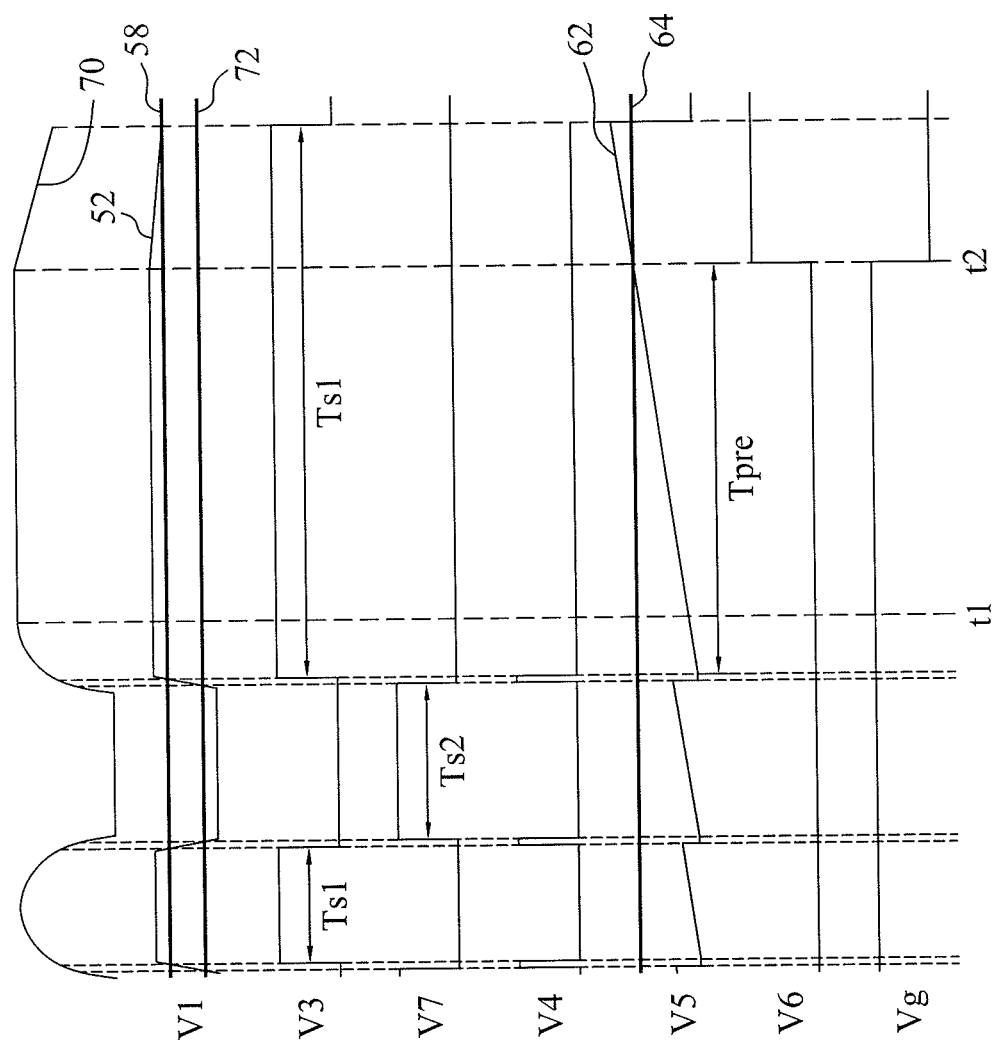
FIG. 9 is a waveform diagram of the circuit shown in FIG. 8 when the AC power source is removed in a positive half cycle of the AC voltage.

FIG. 9 is a waveform diagram of the circuit shown in FIG. 8 when the AC power source 10 is removed in a positive half cycle of the AC voltage VAC, in which waveform 70 represents the half-wave rectified voltage of the voltage Vcap across the terminals of the EMI filter capacitor X-CAP, waveform 52 represents the voltage V1, waveform 58 represents the first reference voltage Vref1, and waveform 72 represents the second reference voltage Vref2. Referring to FIGS. 7, 8 and 9, after the AC power source 10 is removed at time t1, the voltage Vcap stays as high as at the instant moment when the AC power source 10 is removed as shown by the waveform 70. If the voltage V1 is higher than the first reference voltage Vref1, the comparator 32 will keep the comparison signal V3 asserted. Once the time Ts1 that the comparison signal V3 has lasted reaches the threshold time Tpre at time t2, the voltage V5 reaches the time-setting voltage Vpre as shown by waveforms 62 and 64 of FIG. 9, respectively; in consequence, the control signal Vg is turned to low. With the first discharge switch QA having a gate-source voltage Vgsa less than its threshold voltage Vt, and the second discharge switch QB having a gate-source voltage Vgsb greater than its threshold voltage Vt, the first discharge switch QA is on while the second discharge switch QB is off. Thus, the high voltage blocking elements Q1 and Q2 and the first discharge switch QA jointly establish a discharge path for discharging the EMI filter capacitor X-CAP.

Figure 10:
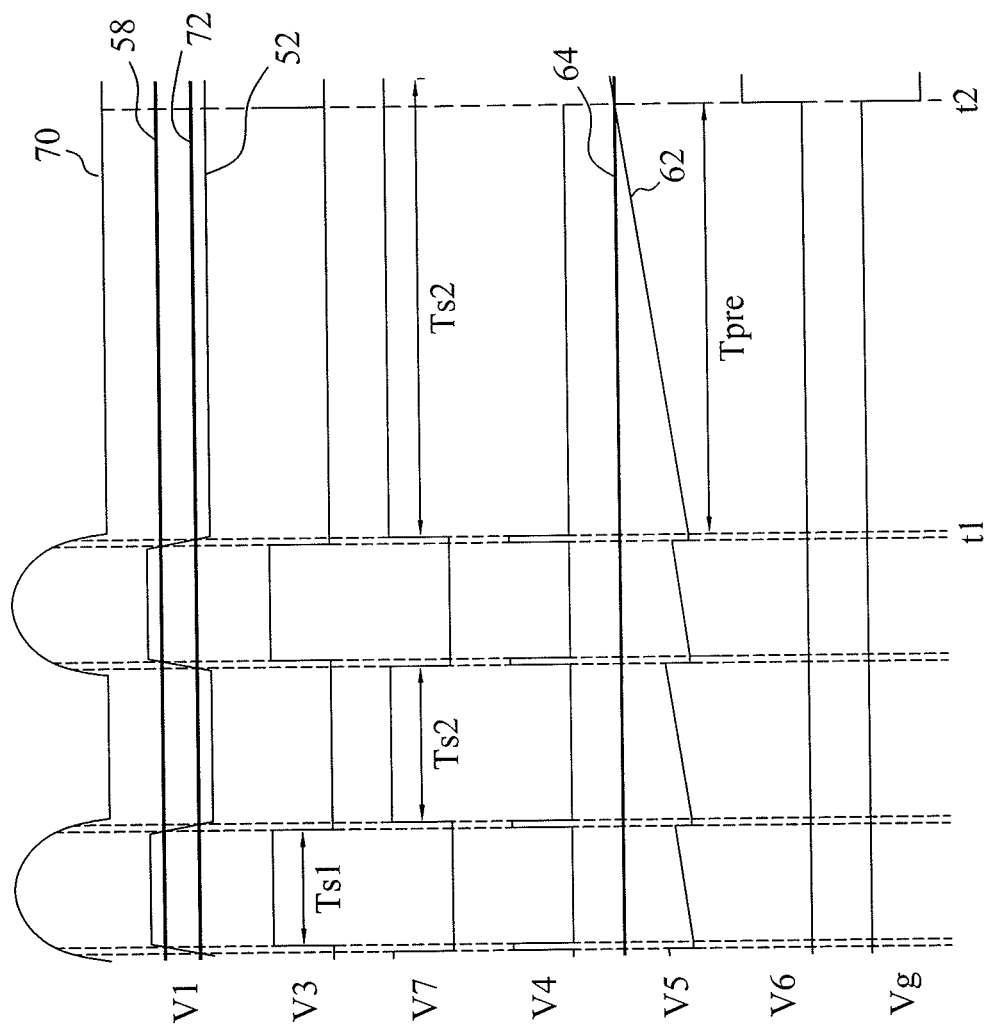
FIG. 10 is a waveform diagram of the circuit shown in FIG. 8 when the AC power source is removed in a negative half cycle of the AC voltage.

FIG. 10 is a waveform diagram of the circuit shown in FIG. 8 when the AC power source 10 is removed in a negative half cycle of the AC voltage VAC. At time t1, the voltage V1 drops below the second reference voltage Vref2 as shown by waveforms 52 and 72, respectively, and because of that, the comparator 44 triggers the second comparison signal V7. At time t2, as shown by waveforms 62 and 64, respectively, the time Ts2 that the second comparison signal V7 has lasted reaches the threshold time Tpre, and the voltage V5 reaches the time-setting voltage Vpre. The controller 22 thus identifies the AC power source 10 as having been removed, and the control signal Vg is turned to low; as a result, the first discharge switch QA has a gate-source voltage Vgsa greater than the threshold voltage Vt, and the second discharge switch QB has a gate-source voltage Vgsb less than the threshold voltage Vt. In other words, the first discharge switch QA is off and the second discharge switch QB is on, such that the second discharge switch QB and the high voltage blocking elements Q1 and Q2 jointly establish a discharge path for discharging the EMI filter capacitor X-CAP.

Figure 11:
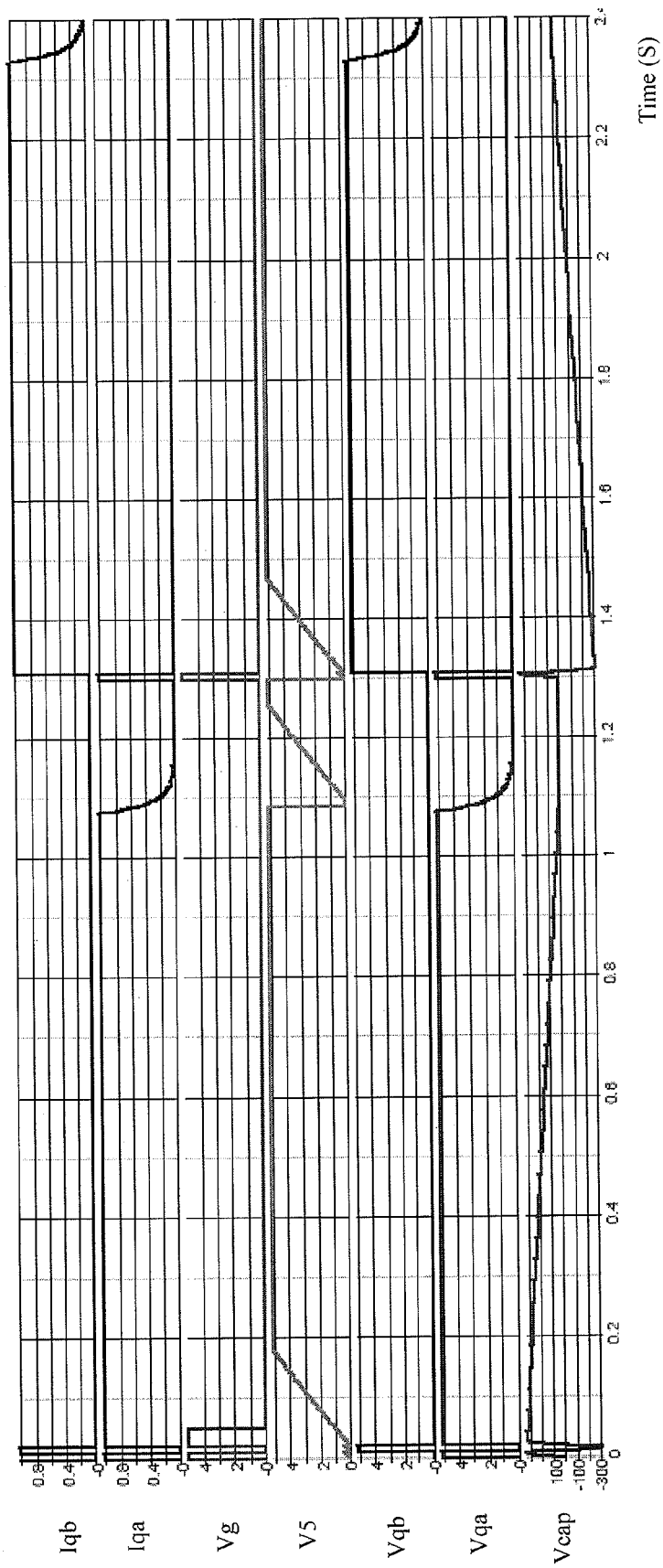
FIG. 11 is a simulation result obtained when the controller of FIG. 7 uses the circuit of FIG. 8.

FIG. 11 shows a simulation result obtained when the controller 22 of FIG. 7 uses the circuit of FIG. 8. Regardless of whether the AC power source 10 is removed at a peak or valley of the voltage Vcap, the independent bleeding IC device 20 can relax the voltage Vcap to the range specified in the aforementioned safety specifications within one second.

Figure 12:
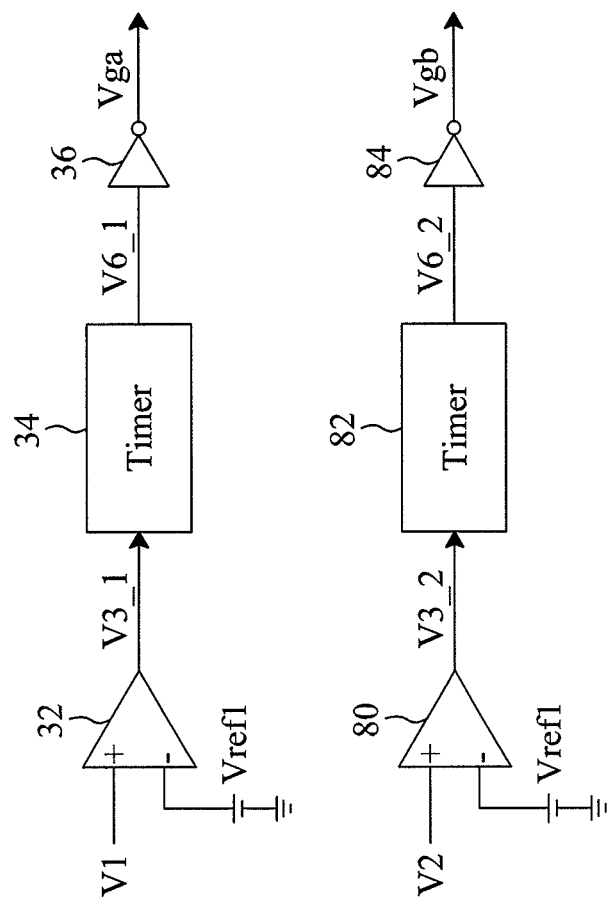
FIG. 12 is a circuit diagram of a second embodiment for the controller shown in FIG. 7.

FIG. 12 shows a second embodiment of the controller 22 in FIG. 7, in which a first comparator 32 is connected to the first terminal V1 of the bleeding switch 24 for comparing the voltage V1 with a reference voltage Vref1 to trigger a first comparison signal V3_1 when the voltage V1 becomes higher than the reference voltage Vref1, a first timer 34 will trigger a first control signal V6_1 once the time that the first comparison signal V3_1 has lasted reaches the threshold time Tpre, a first inverting driver 36 generates a control signal Vga according to the first control signal V6_1 to turn on the first discharge switch QA, a second comparator 80 is connected to the second terminal V2 of the bleeding switch 24 for comparing the voltage V2 with a reference voltage Vref1 to trigger a second comparison signal V3_2 when the voltage V2 becomes higher than the reference voltage Vref1, a second timer 82 will trigger a second control signal V6_2 once the time, that the second comparison signal V3_2 has lasted reaches the threshold time Tpre, and a second inverting driver 84 generates a control signal Vgb according to the second control signal V6_2 to turn on the second discharge switch QB. The timers 34 and 82 shown in FIG. 12 may have the same circuit as detailed in FIG. 4.

In a different embodiment, it may use only one of the two groups of circuits shown in FIG. 12 to detect one of the voltages V1 and V2 of the bleeding switch 24 for identifying whether the AC power source 10 has been removed.

Figure 13:
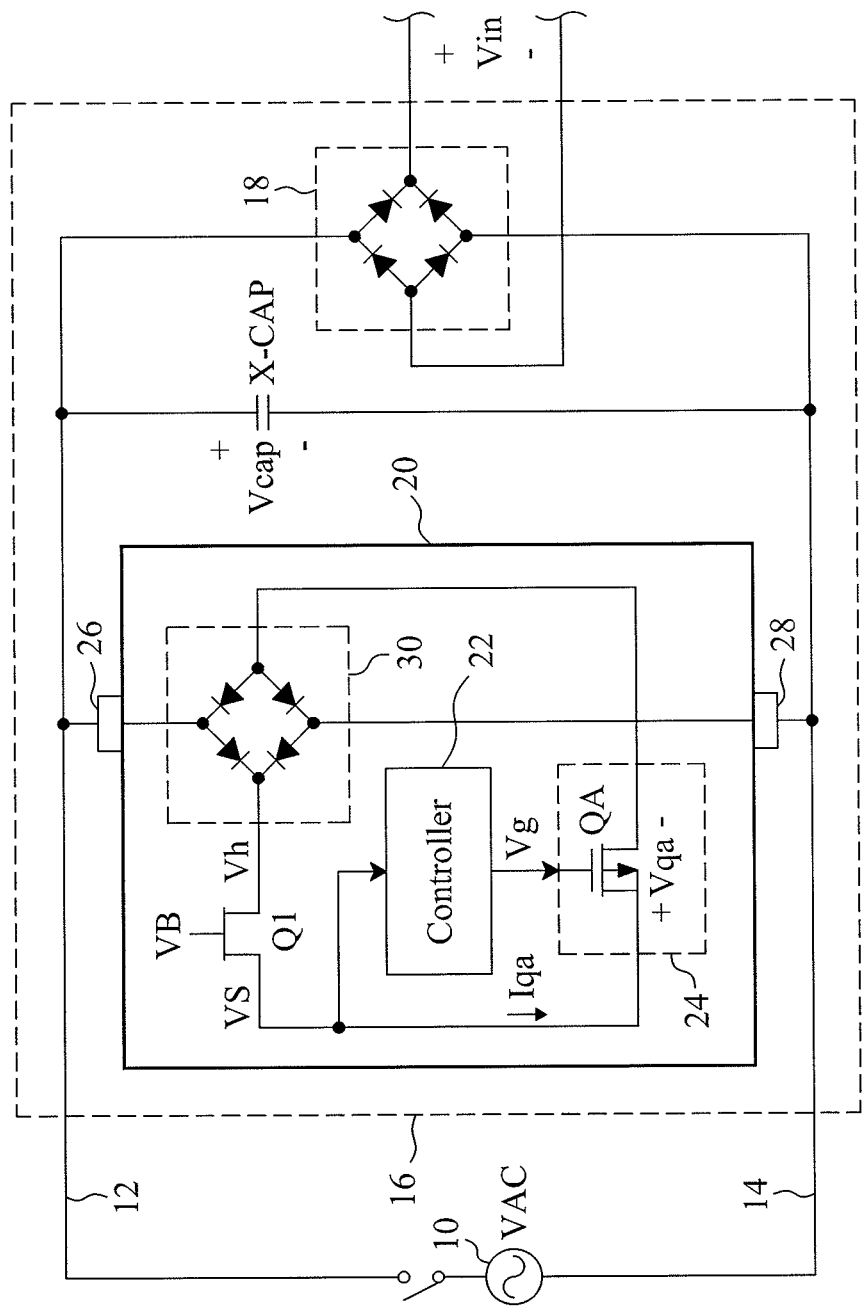
FIG. 13 is a circuit diagram of a third embodiment for the self-discharge bleeding circuit shown in FIG. 2.

FIG. 13 shows a third embodiment of the self-discharge bleeding circuit shown in FIG. 2, in which the input terminals of an internal bridge rectifier 30 are connected to the pins 26 and 28, respectively, so as for the internal bridge rectifier 30 to rectify the voltage Vcap of the EMI filter capacitor X-CAP to generate an under detection voltage Vh, and a high voltage blocking element Q1 is connected between the first output terminal Vh of the internal bridge rectifier 30 and the bleeding switch 24 for clamping the under detection voltage Vh to generate an under detection voltage VS. As the maximum value of the under detection voltage VS is clamped by the high voltage blocking element Q1, both the controller 22 and the bleeding switch 24 can be made by low-voltage manufacturing processes. The bleeding switch 24 includes a discharge switch QA connected between the high voltage blocking element Q1 and the second output terminal of the bridge rectifier 30. The controller 22 detects the under detection voltage VS to identify whether the AC power source 10 has been removed. Once the AC power source 10 is removed, the controller 22 turns on the discharge switch QA such that the discharge switch QA, the high voltage blocking element Q1, and the bridge rectifier 30 jointly establish a discharge path for discharging the EMI filter capacitor X-CAP.

Figure 14:
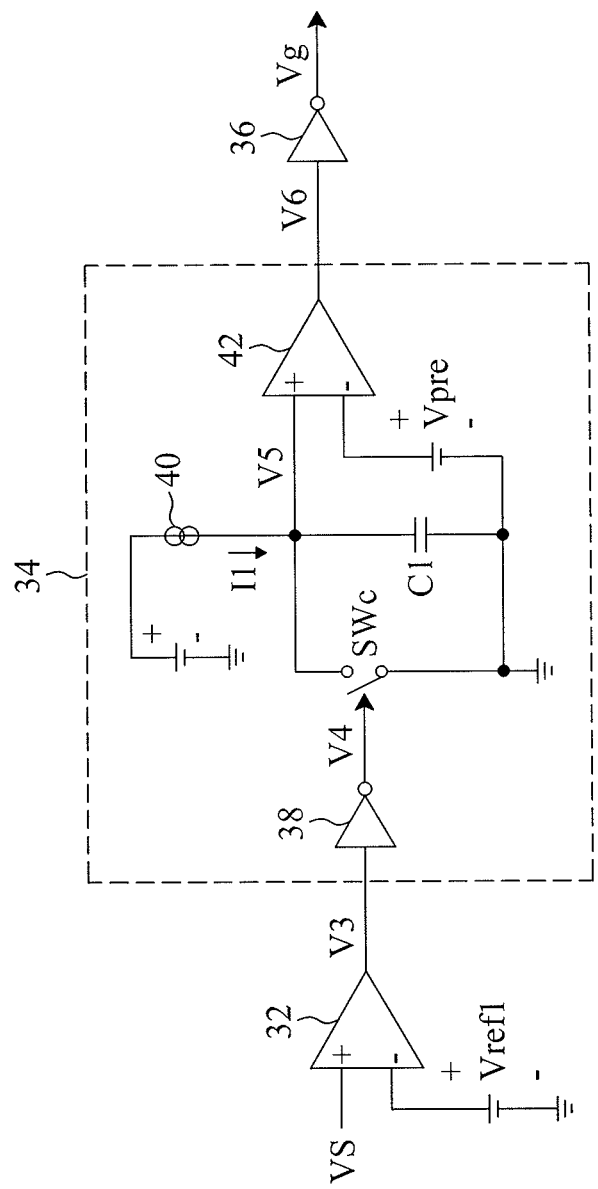
FIG. 14 is a circuit diagram of an embodiment for the controller shown in FIG. 13.

FIG. 14 shows an embodiment of the controller 22 in FIG. 13. Referring to FIG. 14 in conjunction with FIG. 5, a comparator 32 compares the under detection voltage VS with a reference voltage Vref1 to trigger a comparison signal V3, where the under detection voltage VS has a waveform as shown by the waveform 56 in FIG. 5. As soon as the under detection voltage VS rises above the reference voltage Vref1, the comparison signal V3 is asserted as shown by the waveform 60, and the timer 34 counts the time Ts that the comparison signal V3 lasts. Upon removal of the AC power source 10, if the under detection voltage VS is higher than the reference voltage Vref1, as shown by waveforms 56 and 58 at time t3 in FIG. 5, respectively, the comparator 32 will continue the comparison signal V3, and until time t4, the time Ts that the comparison signal V3 has lasted reaches the threshold time Tpre, the voltage V5 rises to the time-setting voltage Vpre, as shown by the waveforms 62 and 64, respectively, the timer 34 triggers the control signal V6, and the control signal Vg generated by the inverting driver 36 according to the control signal V6 is turned to low, thereby turning on the discharge switch QA for discharging the EMI filter capacitor X-CAP.

Figure 15:
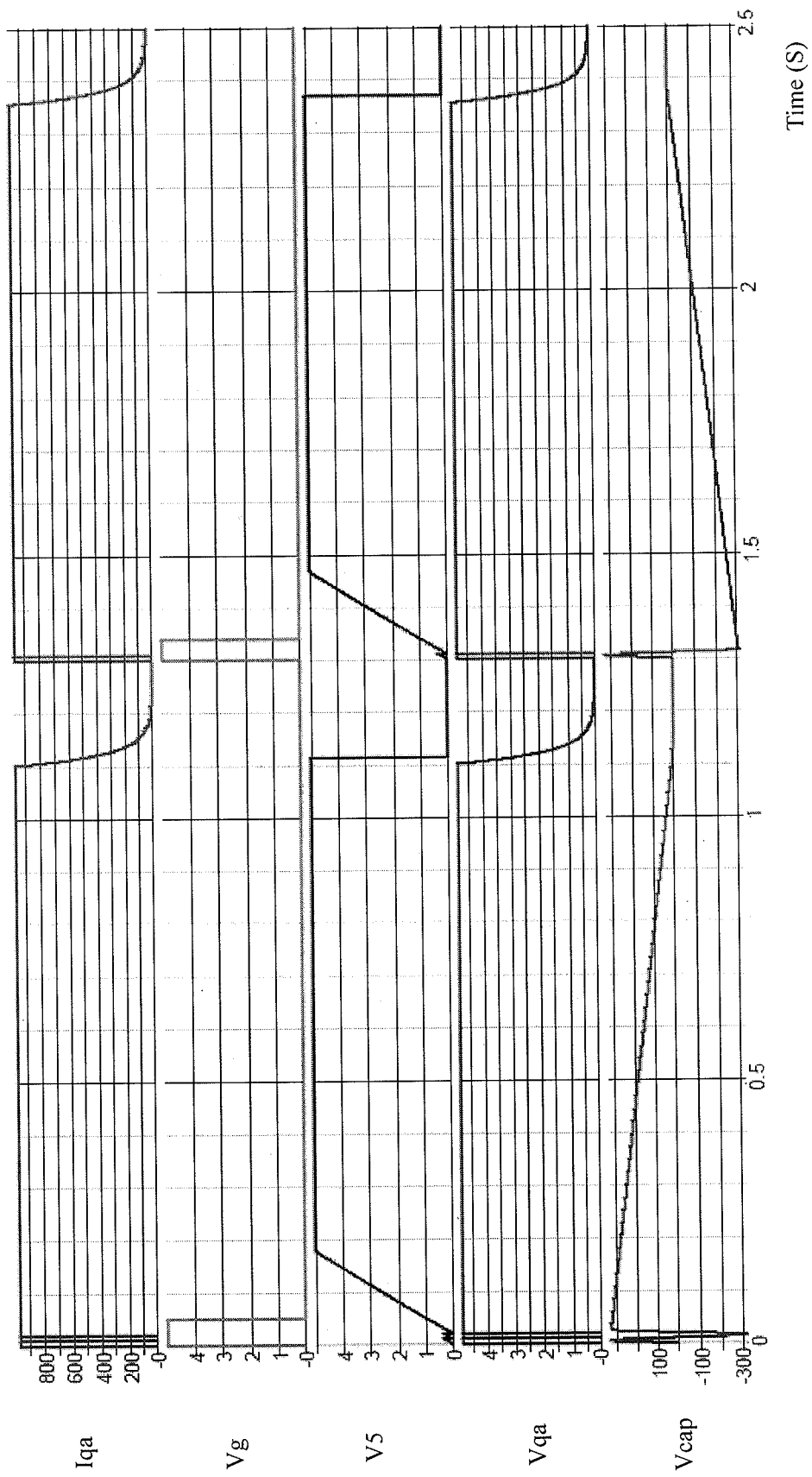
FIG. 15 is a simulation result obtained when the controller of FIG. 13 uses the circuit of FIG. 14.

FIG. 15 shows a simulation result obtained when the controller 22 of FIG. 13 uses the circuit of FIG. 14. Regardless of whether the AC power source 10 is removed at a peak or valley of the voltage Vcap, the independent bleeding IC device 20 can relax the voltage Vcap to the range specified in the aforementioned safety specifications within one second.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A self-discharge bleeding circuit connected between two terminals of an EMI filter capacitor, comprising:
a bleeding switch connected between the two terminals of the EMI filter capacitor; and
a controller connected to the bleeding switch, configured to turn on the bleeding switch when a time that a voltage of the EMI filter capacitor has continuously exceeded a threshold value reaches a threshold time, to thereby establish a discharge path between the two terminals of the EMI filter capacitor for the EMI filter capacitor to discharge through the discharge path;

wherein the bleeding switch comprises two discharge switches in an opposite series connection between two terminals of the bleeding switch, with an interconnection node between the two discharge switches that is connected to the controller, both the two discharge switches being controlled by the controller;

wherein the controller comprises:
an internal bridge rectifier having two input terminals connected to the two terminals of the bleeding switch, respectively, rectifying a voltage between the two terminals of the bleeding switch to generate an under detection voltage;
a comparator connected to the internal bridge rectifier, comparing the under detection voltage with a reference voltage to assert a comparison signal when the under detection voltage is higher than the reference voltage; and
a timer connected to the comparator, triggering a control signal when a time that the comparison signal has lasted reaches the threshold time, to turn on one of the two discharge switches.

2. The self-discharge bleeding circuit of claim 1, further comprising two high voltage blocking elements connected to two terminals of the bleeding switch, respectively, clamping voltages at the two terminals of the bleeding switch.

3. A self-discharge bleeding circuit connected between two terminals of an EMI filter capacitor, comprising:
a bleeding switch connected between the two terminals of the EMI filter capacitor; and
a controller connected to the bleeding switch, configured to turn on the bleeding switch when a time that a voltage of the EMI filter capacitor has continuously exceeded a threshold value reaches a threshold time, to thereby establish a discharge path between the two terminals of the EMI filter capacitor for the EMI filter capacitor to discharge through the discharge path;
wherein the bleeding switch comprises two discharge switches in an opposite parallel connection between two terminals of the bleeding switch, controlled by the controller;
wherein the controller comprises:
two comparators both connected to one of the two terminals of the bleeding switch, comparing a voltage at the connected terminal of the bleeding switch with a first reference voltage and a second reference voltage, respectively, to assert a first comparison signal when the voltage at the connected terminal of the bleeding switch is higher than the first reference voltage, and a second comparison signal when the voltage at the connected terminal of the bleeding switch is lower than the second reference voltage, the first reference voltage being higher than the second reference voltage; and
a timer connected to the two comparators, triggering a control signal when a time that the first comparison signal or the second comparison signal has lasted reaches the threshold time, to turn on one of the two discharge switches.

4. A self-discharge bleeding circuit connected between two terminals of an EMI filter capacitor, comprising:
a bleeding switch connected between the two terminals of the EMI filter capacitor;
a controller connected to the bleeding switch, configured to turn on the bleeding switch when a time that a voltage of the EMI filter capacitor has continuously exceeded a threshold value reaches a threshold time, to thereby establish a discharge path between the two terminals of the EMI filter capacitor for the EMI filter capacitor to discharge through the discharge path; and
an internal bridge rectifier having two input terminals connected to the two terminals of the EMI filter capacitor, respectively, and two output terminals with the bleeding switch connected therebetween, to thereby generate an under detection voltage for the controller;
wherein the controller comprises:
a comparator comparing the under detection voltage with a reference voltage to assert a comparison signal when the under detection voltage is higher than the reference voltage; and
a timer connected to the comparator, triggering a control signal when a time that the comparison signal has lasted reaches the threshold time, to turn on the bleeding switch.

5. The self-discharge bleeding circuit of claim 4, further comprising a high voltage blocking element connected between the internal bridge rectifier and the bleeding switch, clamping the under detection voltage.

6. An independent bleeding integrated circuit device connected between two terminals of an EMI filter capacitor, comprising:
a first pin and a second pin connected to the two terminals of the EMI filter capacitor, respectively;
a bleeding switch connected between the first pin and the second pin; and
a controller connected to the bleeding switch, configured to turn on the bleeding switch when a time that a voltage of the EMI filter capacitor has continuously exceeded a threshold value reaches a threshold time, to thereby establish a discharge path between the two terminals of the EMI filter capacitor for the EMI filter capacitor to discharge through the discharge path;
wherein the bleeding switch comprises two discharge switches in an opposite series connection between two terminals of the bleeding switch, with an interconnection node between the two discharge switches that is connected to the controller, both the two discharge switches being controlled by the controller;
wherein the controller comprises:
an internal bridge rectifier having two input terminals connected to the two terminals of the bleeding switch, respectively, rectifying a voltage between the two terminals of the bleeding switch to generate an under detection voltage;
a comparator connected to the internal bridge rectifier, comparing the under detection voltage with a reference voltage to assert a comparison signal when the under detection voltage is higher than the reference voltage; and
a timer connected to the comparator, triggering a control signal when a time that the comparison signal has lasted reaches the threshold time, to turn on one of the two discharge switches.

7. The independent bleeding integrated circuit device of claim 6, further comprising two high voltage blocking elements connected between the first pin and the bleeding switch and between the second pin and the bleeding switch, respectively, clamping voltages at two terminals of the bleeding switch.

8. An independent bleeding integrated circuit device connected between two terminals of an EMI filter capacitor, comprising:
- a first pin and a second pin connected to the two terminals of the EMI filter capacitor, respectively;
- a bleeding switch connected between the first pin and the second pin; and
- a controller connected to the bleeding switch, configured to turn on the bleeding switch when a time that a voltage of the EMI filter capacitor has continuously exceeded a threshold value reaches a threshold time, to thereby establish a discharge path between the two terminals of the EMI filter capacitor for the EMI filter capacitor to discharge through the discharge path;
- wherein the bleeding switch comprises two discharge switches in an opposite parallel connection between two terminals of the bleeding switch, controlled by the controller;
- wherein the controller comprises:
  - two comparators both connected to one of the two terminals of the bleeding switch, comparing a voltage at the connected terminal of the bleeding switch with a first reference voltage and a second reference voltage, respectively, to assert a first comparison signal when the voltage at the connected terminal of the bleeding switch is higher than the first reference voltage, and a second comparison signal when the voltage at the connected terminal of the bleeding switch is lower than the second reference voltage, the first reference voltage being higher than the second reference voltage; and
  - a timer connected to the two comparators, triggering a control signal when a time that the first comparison signal or the second comparison signal has lasted reaches the threshold time, to turn on one of the two discharge switches.

9. An independent bleeding integrated circuit device connected between two terminals of an EMI filter capacitor, comprising:
- a first pin and a second pin connected to the two terminals of the EMI filter capacitor, respectively;
- a bleeding switch connected between the first and the second pin;
- a controller connected to the bleeding switch, configured to turn on the bleeding switch when a time that a voltage of the EMI filter capacitor has continuously exceeded a threshold value reaches a threshold time, to thereby establish a discharge path between the two terminals of the EMI filter capacitor for the EMI filter capacitor to discharge through the discharge path; and
- an internal bridge rectifier having two input terminals connected to the two pins, respectively, and two output terminals with the bleeding switch connected therebetween, to thereby generate an under detection voltage for the controller;
- wherein the controller comprises:
  - a comparator comparing the under detection voltage with a reference voltage to assert a comparison signal when the under detection voltage is higher than the reference voltage; and
  - a timer connected to the comparator, triggering a control signal when a time that the comparison signal has lasted reaches the threshold time, to turn on the bleeding switch.

10. The independent bleeding integrated circuit device of claim 9, further comprising a high voltage blocking element connected between the internal bridge rectifier and the bleeding switch, clamping the under detection voltage.

11. A bleeding method for an EMI filter capacitor connected between two AC power input terminals, comprising:
- A.) connecting a bleeding switch between the two AC power input terminals, wherein the bleeding switch is open circuit when the two AC power input terminals are connected to an AC power source; and
- B.) turning on the bleeding switch when a time that a voltage of the EMI filter capacitor has continuously exceeded a threshold value reaches a threshold time, for establishing a discharge path between two terminals of the EMI filter capacitor for the EMI filter capacitor to discharge through the discharge path;
- wherein the step B comprises:
  - rectifying a voltage between two terminals of the bleeding switch to generate an under detection voltage;
  - comparing the under detection voltage with a reference voltage, to assert a comparison signal when the under detection voltage is higher than the reference voltage; and
  - turning on the bleeding switch when a time that the comparison signal has lasted reaches the threshold time.

12. The bleeding method of claim 11, further comprising clamping voltages at two terminals of the bleeding switch.

13. A bleeding method for an EMI filter capacitor connected between two AC power input terminals, comprising:
- A.) connecting a bleeding switch between the two AC power input terminals, wherein the bleeding switch is open circuit when the two AC power input terminals are connected to an AC power source; and
- B.) turning on the bleeding switch when a time that a voltage of the EMI filter capacitor has continuously exceeded a threshold value reaches a threshold time, for establishing a discharge path between two terminals of the EMI filter capacitor for the EMI filter capacitor to discharge through the discharge path;
- wherein the step B comprises:
  - comparing a voltage at one of two terminals of the bleeding switch with a first reference voltage and a second reference voltage, respectively, to assert a first comparison signal when the voltage at the connected terminal of the bleeding switch is higher than the first reference voltage, and a second comparison signal when the voltage at the connected terminal of the bleeding switch is lower than the second reference voltage, the first reference voltage being higher than the second reference voltage; and
  - turning on the bleeding switch when a time that the first comparison signal or the second comparison signal has lasted reaches the threshold time.

14. An AC/DC power interface connected between two AC power input terminals, comprising:
- an external bridge rectifier having two input terminals connected to the two AC power input terminals, respectively;
- an EMI filter capacitor connected between the two AC power input terminals;
- a bleeding switch connected between the two terminals of the EMI filter capacitor; and
- a controller connected to the bleeding switch, configured to turn on the bleeding switch when a time that a voltage of the EMI filter capacitor has continuously exceeded a threshold value reaches a threshold time, to thereby establish a discharge path between the two terminals of the EMI filter capacitor for the EMI filter capacitor to discharge through the discharge path;

wherein the bleeding switch comprises two discharge switches in an opposite series connection between two terminals of the bleeding switch, with an interconnection node between the two discharge switches that is connected to the controller, both the two discharge switches being controlled by the controller;

wherein the controller comprises:

an internal bridge rectifier having two input terminals connected to the two terminals of the bleeding switch, respectively, rectifying a voltage between the two terminals of the bleeding switch to generate an under detection voltage;

a comparator connected to the internal bridge rectifier, comparing the under detection voltage with a reference voltage to assert a comparison signal when the under detection voltage is higher than the reference voltage; and a timer connected to the comparator, triggering a control signal when a time that the comparison signal has lasted reaches the threshold time, to turn on one of the two discharge switches.

15. The AC/DC power interface of claim 14, wherein the bleeding switch and the controller are in a same integrated circuit device.

16. The AC/DC power interface of claim 14, further comprising two high voltage blocking elements connected to two terminals of the bleeding switch, respectively, clamping voltages at the two terminals of the bleeding switch.

17. The AC/DC power interface of claim 16, wherein the bleeding switch, the controller and the two high voltage blocking elements are in a same integrated circuit device.

18. An AC/DC power interface connected between two AC power input terminals, comprising:

an external bridge rectifier having two input terminals connected to the two AC power input terminals, respectively;

an EMI filter capacitor connected between the two AC power input terminals;

a bleeding switch connected between the two terminals of the EMI filter capacitor; and a controller connected to the bleeding switch, configured to turn on the bleeding switch when a time that a voltage of the EMI filter capacitor has continuously exceeded a threshold value reaches a threshold time, to thereby establish a discharge path between the two terminals of the EMI filter capacitor for the EMI filter capacitor to discharge through the discharge path;

wherein the bleeding switch comprises two discharge switches in an opposite parallel connection between two terminals of the bleeding switch, controlled by the controller;

wherein the controller comprises:

two comparators both connected to one of the two terminals of the bleeding switch, comparing a voltage at the connected terminal of the bleeding switch with a first reference voltage and a second reference voltage, respectively, to assert a first comparison signal when the voltage at the connected terminal of the bleeding switch is higher than the first reference voltage, and a second comparison signal when the voltage at the connected terminal of the bleeding switch is lower than the second reference voltage, the first reference voltage being higher than the second reference voltage; and a timer connected to the two comparators, triggering a control signal when a time that the first comparison signal or the second comparison signal has lasted reaches the threshold time, to turn on one of the two discharge switches.

19. An AC/DC power interface connected between two AC power input terminals, comprising:

an external bridge rectifier having two input terminals connected to the two AC power input terminals, respectively;

an EMI filter capacitor connected between the two AC power input terminals;

a bleeding switch connected between the two terminals of the EMI filter capacitor;

a controller connected to the bleeding switch, configured to turn on the bleeding switch when a time that a voltage of the EMI filter capacitor has continuously exceeded a threshold value reaches a threshold time, to thereby establish a discharge path between the two terminals of the EMI filter capacitor for the EMI filter capacitor to discharge through the discharge path; and an internal bridge rectifier having two input terminals connected to the two pins, respectively, and two output terminals with the bleeding switch connected therebetween, to thereby generate an under detection voltage for the controller;

wherein the controller comprises:

a comparator comparing the under detection voltage with a reference voltage to assert a comparison signal when the under detection voltage is higher than the reference voltage; and a timer connected to the comparator, triggering a control signal when a time that the comparison signal has lasted reaches the threshold time, to turn on the bleeding switch.

20. The AC/DC power interface of claim 19, wherein the bleeding switch, the controller and the internal bridge rectifier are in a same integrated circuit device.

21. The AC/DC power interface of claim 19, further comprising a high voltage blocking element connected between the internal bridge rectifier and the bleeding switch, clamping the under detection voltage.

22. The AC/DC power interface of claim 21, wherein the bleeding switch, the controller, the internal bridge rectifier and the high voltage blocking element are in a same integrated circuit device.

* * * * *